United States Patent
Saman et al.

(10) Patent No.: US 8,044,706 B2
(45) Date of Patent: Oct. 25, 2011

(54) REDUCED CAPACITOR CHARGE-PUMP

(75) Inventors: Hynek Saman, Beroun (CZ); Jim Brown, Livingston (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 12 days.

(21) Appl. No.: 12/589,020

(22) Filed: Oct. 16, 2009

(65) Prior Publication Data
US 2011/0084756 A1    Apr. 14, 2011

(30) Foreign Application Priority Data

Oct. 9, 2009 (EP) ................................... 09368036

(51) Int. Cl.
*G05F 1/10* (2006.01)
(52) U.S. Cl. .......................................... 327/536; 363/60
(58) Field of Classification Search ................... 327/536; 363/59–60
See application file for complete search history.

(56) References Cited

U.S. PATENT DOCUMENTS

| | | | | |
|---|---|---|---|---|
| 5,532,916 A * | 7/1996 | Tamagawa | ........................ | 363/62 |
| 5,668,710 A * | 9/1997 | Caliboso et al. | ................. | 363/60 |
| 6,922,097 B2 | 7/2005 | Chan et al. | | |
| 7,199,641 B2 * | 4/2007 | Wei | ................................ | 327/427 |
| 7,282,985 B2 * | 10/2007 | Yen et al. | ....................... | 327/536 |
| 7,456,677 B1 * | 11/2008 | Rao et al. | ....................... | 327/536 |
| 7,541,859 B2 * | 6/2009 | Akashi et al. | .................. | 327/536 |
| 7,602,232 B2 * | 10/2009 | Georgescu et al. | ........... | 327/536 |
| 7,612,603 B1 * | 11/2009 | Petricek et al. | ................ | 327/530 |
| 7,667,530 B2 * | 2/2010 | Chu et al. | ....................... | 327/536 |
| 7,830,209 B1 * | 11/2010 | Woodford et al. | ............. | 330/297 |
| 2005/0140426 A1 * | 6/2005 | Fujiwara | ........................ | 327/536 |
| 2008/0088179 A1 | 4/2008 | Oyama et al. | | |
| 2008/0116979 A1 | 5/2008 | Lesso et al. | | |
| 2008/0159567 A1 * | 7/2008 | Lesso et al. | .................... | 381/120 |
| 2009/0039947 A1 * | 2/2009 | Williams | ....................... | 327/536 |

FOREIGN PATENT DOCUMENTS

GB    2 455 524    6/2009
WO    WO 2006/043479    4/2006

OTHER PUBLICATIONS

Co-pending US Patent DS09-011, U.S. Appl. No. 12/589,021, filed Oct. 16, 2009, "VDD/5 or VDD/6 Charge-Pump," assigned to the same assignee as the present invention.
European Search Report, 09368045.2-2207, Mail date—Feb. 8, 2011, Dialog Semiconductor GmbH.

* cited by examiner

*Primary Examiner* — Thomas J Hiltunen
(74) *Attorney, Agent, or Firm* — Saile Ackerman LLC; Stephen B. Ackerman

(57) ABSTRACT

Systems and methods to achieve a charge pump for generating from single supply voltage energy efficient supply voltages that are symmetrical around ground voltage have been disclosed. The charge pump requires two flying capacitors only. The charge pump generates positive and negative supply voltages following a 1/N ratio of Vdd voltage, i.e. +−Vdd/N, and can be generalized to generate +/−Vdd/$2^N$ voltages. This is especially useful for supplying class-G amplifiers.

28 Claims, 4 Drawing Sheets

|  | S0 | S1 | S2 | S3 | S4 | S5 | S6 | S7 | S8 | S9 | S10 | S11 | S12 | S13 |
|---|---|---|---|---|---|---|---|---|---|---|---|---|---|---|
| Phase1 |  | ON |  |  |  |  |  |  |  | ON | ON | ON | ON |  |
| Phase2 |  |  |  | ON | ON | ON |  | ON | ON |  |  |  |  | ON |
| Phase3 |  | ON |  |  |  | ON | ON | ON |  | ON |  | ON | ON |  |
| Phase4 |  |  |  |  | ON |  | ON |  |  |  | ON |  |  | ON |

FIG. 2

REDUCED CAPACITOR CHARGE-PUMP

This application is related to U.S. patent application Ser. No. 12/589,021, filed on Oct. 16, 2009, which is incorporated by reference herein and assigned to the same assignee as the present invention.

BACKGROUND OF THE INVENTION (1) Field of the Invention

This invention relates generally to DC-to-DC converters and relates more specifically to DC-to-DC converters generating output symmetrical positive and negative supply voltages from a single supply voltage using charge pump technique.

(2) Description of the Prior Art

Generating energy efficient reduced supply voltages is key in modern audio systems to be able to generate lower supply voltages when low power consumption for audio playback is required. It is also important that the generated supply voltages have to be symmetrical around ground so that AC coupling capacitors are not required on the audio outputs. These are called "True ground outputs". Amplifiers adjusting their supply voltages dependent upon the output signal are called "Class-G" amplifiers. The Class-G amplifier has several power rails at different voltages, and switches between rails as the signal output approaches each. Thus the amplifier increases efficiency by reducing the wasted power at the output transistors.

For electronic devices such as "Class-G" amplifiers symmetrical positive and negative supply voltages from a single input supply voltage (Vdd) should be generated, wherein the resulting positive voltage (Vp) and negative voltage are according a 1/N ratio of Vdd (Vp, Vn=+/−Vdd/N).

It is a challenge for the designers of charge pumps generating symmetrical output voltages requiring a minimum number of flying capacitors.

There are known patents dealing with charge pumps generating symmetrical voltages.

WO Patent 2006/043479 to Oyama Manabu et al. discloses a switching power supply capable of outputting a plurality of voltages through simple circuitry. The switching power supply steps up or inverts an input voltage Vin applied to an input terminal before outputting it from a first output terminal and a second output terminal. When first and fourth switches SW1 and SW4 are turned on, a flying capacitor Cf is charged. When second and fifth switches and are turned on, charges of the flying capacitor Cf are transferred to a first output capacitor Co1. When third and sixth switches and are turned on, charges of the flying capacitor are transferred to a second output capacitor. Input voltage is outputted as a first output voltage Vout1 from the first output terminal, and inverted input voltage −Vin is outputted as a second output voltage Vout2 from the second output terminal.

U.S. Patent (U.S. Pat. No. 6,922,097 to Chan et al.) proposes a symmetric dual-voltage charge pump and its control circuit generating bipolar output voltages. The charge pump converts a unipolar power source to a set of dual-voltage outputs of opposite polarity that are completely independent of each other. The charge pump includes two voltage-boosting transfer capacitors and two output capacitors. Two-phase operation generates an increased-magnitude output voltage of a negative polarity and another two phases of operation generate an increased output voltage of a positive polarity. The charge pump selectively charges one or both of the bipolar outputs with individual 2-phase charge cycles or with a sequence of charge cycles. When controlled by comparators with unequal reference voltages, the charge pump can force the bipolar outputs to unequal positive and negative voltages. Charge pumping is faster since only 2 phases are needed for charging either the positive or negative output.

U.S. Patent Application (US 2008/0116979 to Lesso et al.) proposes a signal amplifying circuit and associated methods and apparatuses, the circuit comprising: a signal path extending from an input terminal to an output terminal, a gain controller arranged to control the gain applied along the signal path in response to a control signal; an output stage within the signal path for generating the output signal, the output stage having a gain that is substantially independent of its supply voltage, and a variable voltage power supply comprising a charge pump for providing positive and negative output voltages, the charge pump comprising a network of switches that is operable in a number of different states and a controller for operating the switches in a sequence of the states so as to generate positive and negative output voltages together spanning a voltage approximately equal to the input voltage.

Furthermore Patent GB 245 5524 to MacFarlane et al. describes a charge pump circuit and method of generating a voltage supply Vout+, Vout− from a single input supply +VDD, which comprises connecting at least one flying capacitor (Cf) to at least one reservoir capacitor (CR1, CR2) and to the input supply in repeated cycles so as to generate a voltage on the reservoir capacitor. The cycles differ between at least two modes so that each mode generates a different voltage on the reservoir capacitor. The method includes changing from an existing mode a new mode during operation, and operating in at least one transitional mode for a period prior to fully entering the new mode.

It should be understood that prior art, e.g. GB 245 5524 to MacFarlane et al., requires for generating positive and negative +/−Vdd/N voltages (N−1) flying capacitors. For instance in orders to generate +/−Vdd/4 voltages (N=4) three flying capacitors are required. The problem is that each flying capacitor is an expensive external component and requires extra device pins. Therefore solutions requiring less flying capacitors are desired.

SUMMARY OF THE INVENTION

A principal object of the present invention is to reduce the number of flying capacitors required in charge pumps.

A further object of the invention is to generate symmetrical positive and negative output voltages from a single supply voltage using a charge pump.

A further object of the invention is to achieve a charge pump wherein the ratio between generated output voltages and the supply voltage is ¼.

A further object of the invention is to achieve a charge pump wherein the ratio between generated output voltages and the supply voltage is $Vdd/2^N$ with just N flying capacitors only, with or without feedback control.

A further object of the invention is to achieve an internal or an external charge pump, allowing a reduced number of external components and reduced pin count compared to prior art.

Moreover a further object of the invention is to achieve a charge pump allowing power saving and efficiency by a DC voltage conversion, which does not need linear resistance.

In accordance with the objects of this invention a method for generating energy efficient supply voltages being symmetrical around ground voltage has been achieved. The method invented comprises, firstly, the following steps of: (1) providing an input voltage Vdd and a charge pump circuit, having a positive and a negative output node, comprising a digital controller, a set of switches, two flying capacitors, and two reservoir capacitors, (2) setting output voltage modes desired on the digital controller; and (3) setting switches in order to put voltages on both flying capacitors and on at least one output port according to one or more equations describing a first phase of an actual output voltage mode of the charge pump. Furthermore the method comprises (4) setting switches in order to put voltages on both flying capacitors and on at least one output port according to one or more equations describing a second phase of an actual output voltage mode of the charge pump, (5) setting switches in order to put voltages on both flying capacitors and on one or more output port according to one or more equations describing a third phase of an actual output voltage mode of the charge pump, and (6) setting switches in order to put voltages on both flying capacitors and on one or more output port according to one or more equations describing a fourth phase of an actual output voltage mode of the charge pump. Finally the method comprises the steps of: (7) go to step (8) if charge pump is on, else go to step (10), (8) go to step (9) if output voltage mode is to be changed, else go to step (3), (9) change output voltage mode and go to step (3), and (10) end.

In accordance with the objects of this invention a charge pump generating energy efficient supply voltages being symmetrical around ground voltage has been achieved. The charge pump invented firstly comprises: a digital controller, controlling the operation of the charge pump in a way that the charge pump is providing just the amount of power required by a stage supplied by the charge pump, a first input port connected to Vdd voltage, a second input port connected to ground, a positive output node, and a negative output node. Furthermore the charge pump comprises two reservoir capacitors, wherein a first reservoir capacitor is connected between the positive output node of the charge pump and ground and a second reservoir capacitor is connected between the negative output node of the charge pump and ground, two flying capacitors, and a set of switches activating charging of two flying capacitors and connecting first or second plates of the two flying capacitors to the positive and negative output nodes wherein the set of switches and the related charging of the two flying capacitors are controlled by the digital controller in way that the positive and negative output nodes supply symmetrical output voltages required.

BRIEF DESCRIPTION OF THE DRAWINGS

In the accompanying drawings forming a material part of this description, there is shown:

FIG. 2 illustrates the switching sequence for the ±Vdd/4 mode according the arrangement of switches shown in FIG. 1.

DESCRIPTION OF THE PREFERRED EMBODIMENTS

Circuits and methods for generating output symmetrical positive and negative supply voltages from a single supply voltage (Vdd) by using charge pump technique are disclosed, wherein the resulting positive output voltage (Vp) and negative output voltage (Vn) have a 1/N ratio of Vdd (Vp, Vn=+/−Vdd/N). The methods disclosed can be generalized to generate $+/-Vdd/2^N$ output supply voltages requiring N flying capacitors.

The principle of the invention is based on halving voltages across floating capacitors. So one flying capacitor would yield an output voltage of +/−Vdd/2, two flying capacitors would yield an output voltage of +/−Vdd/4, and three flying capacitors would yield an output voltage of +/−Vdd/8. Furthermore the present invention is using feed-forward structures only FIG. 1 illustrates an overall block diagram of the charge pump 100 showing switches for generating the symmetrical output voltages Vp (positive) and Vn (negative).

Figure 1:
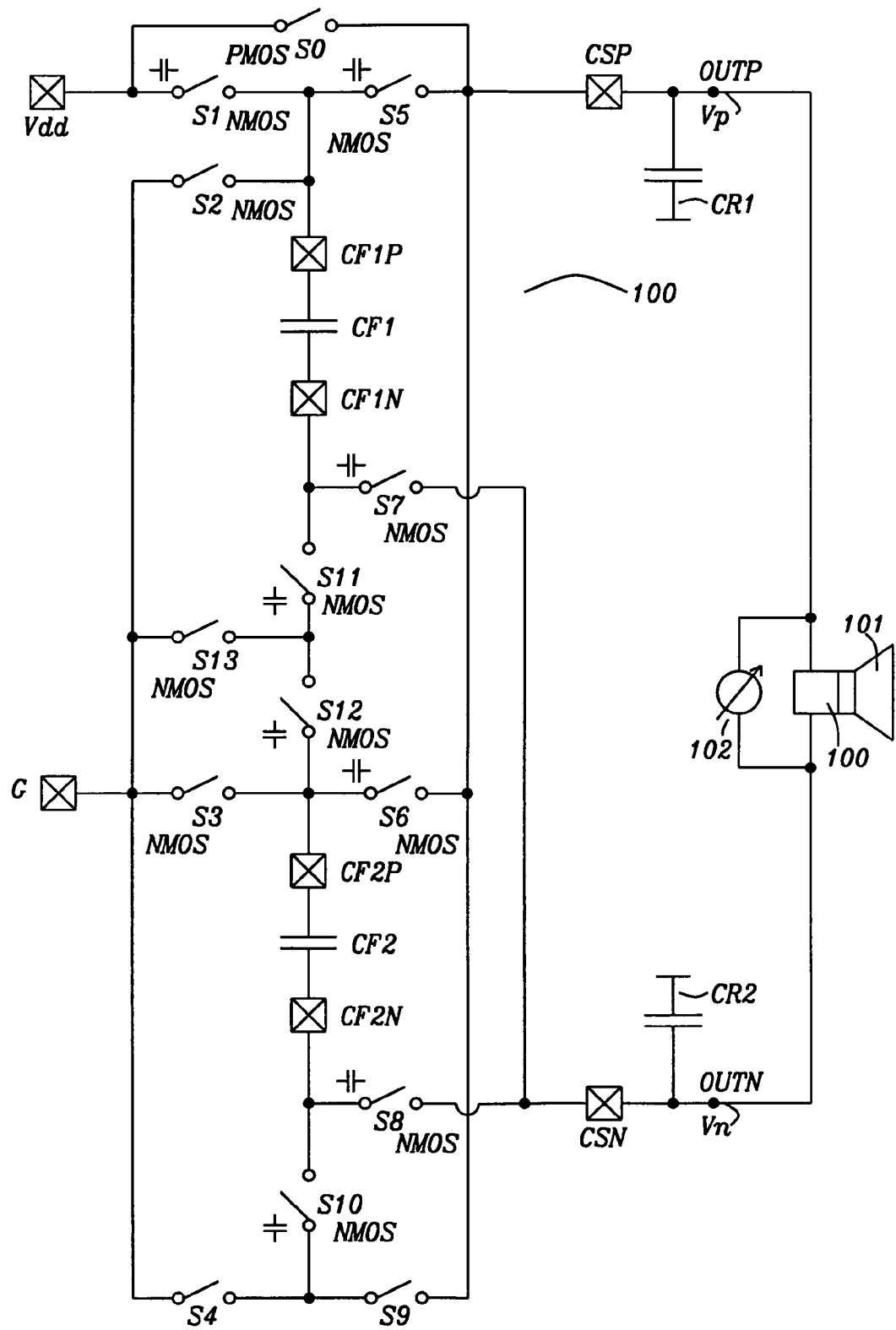
FIG. 1 illustrates an overall block diagram showing switches for generating the symmetrical output voltages CSP (positive) and CSN (negative).

The charge pump of FIG. 1 comprises a set of switches, two external flying capacitors CF1 and CF2, two external reservoir capacitors CR1 and CR2 and a digital controller (not shown). In a preferred embodiment of the invention the charge pump is part of a headphone amplifier 101 providing just the amount of power required according to gain settings. In normal operation the charge pump is driven according to the audio volume with two flying capacitors CF1 and CF2 and two reservoir capacitors CR1 and CR2 four basic operating modes can be achieved, i.e. output voltages Vp and Vn having values of ±¼ Vdd, ±⅓ Vdd, ±½ Vdd, and ±1 Vdd input voltage.

Figure 5:
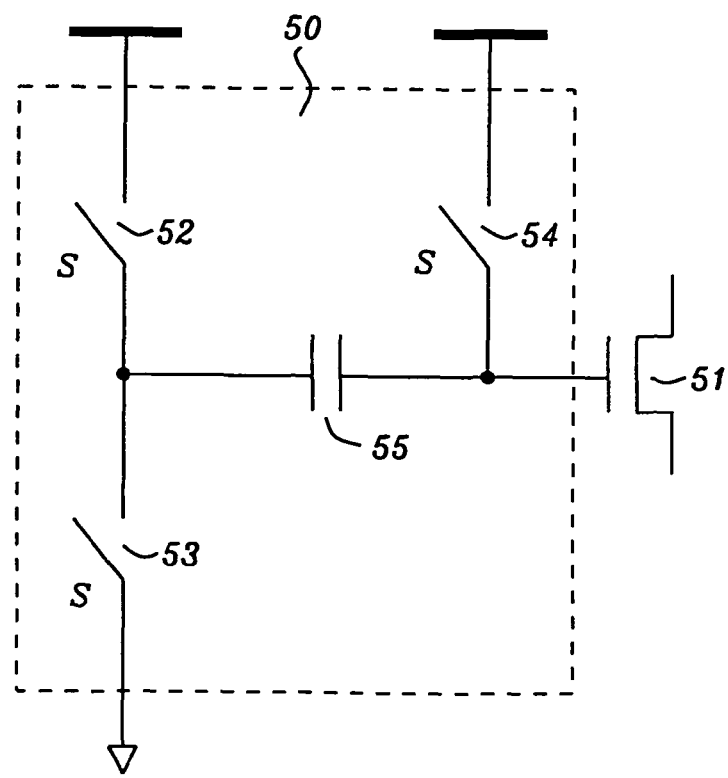
FIG. 5 illustrates an integrated charge pump providing the necessary gate-source voltage for a transistor switch.

FIG. 1 shows also a schematic overview of the switches involved to realize the various operating modes. Totally 14 switches are employed. Some of the switches are integrated bulk switches. All switches, except the PMOS switch S0, are NMOS switches. The switches with an associated capacitor symbol have an integrated charge pump, which provides the necessary gate-source voltage for NMOS transistors, which are used as high-side switches. FIG. 5 illustrates a preferred embodiment of such an integrated charge pump 50 providing the necessary gate-source voltage for transistor switch 51. The charge pump 50 comprises an capacitor 55 and three switches 52-54. Other arrangements of switches and one or more capacitors are also possible to implement a charge pump for such a purpose.

The switches of the charge pump 100 are controlled by a digital controller block such the voltages Vp and Vn on the pins CSP and CSN are just enough for the audio signal to be correctly generated at the output of the class-G audio amplifier 100 connected to a headphone 101. The charge pump 100 is controlled in a class-G type regulation by changing the frequency of the switch controls and the width (full/partial) of the switch devices. Vp is the positive supply voltage of the amplifier and Vn is the negative supply voltage of the amplifier 101.

Figure 4:
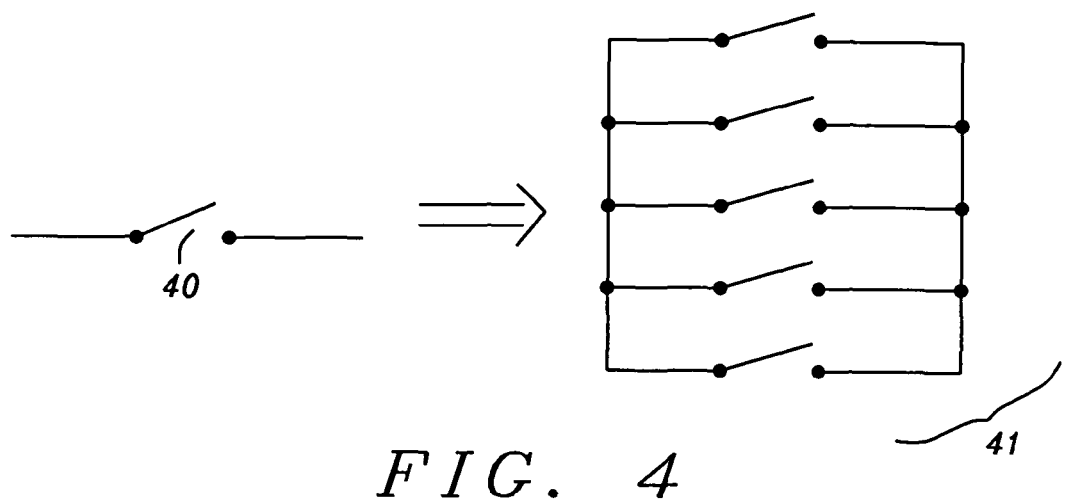
FIG. 4 illustrates a replacement of a single switch by e.g. 5 smaller switches in parallel.

A detection circuit 102 at the outputs of Charge Pump (CP) detects a drop of voltage due to load. In case of a drop of voltage the frequency of the charge pump is adjusted and when a minimum of a set frequency is reached the size of switches is reduced. In the preferred embodiment the size of switches can be reduced to 20% in order to reduce power consumption. FIG. 4 illustrates a replacement of a single switch 40 by e.g. 5 smaller switches 41 in parallel. Each switch is split to 5 switches in parallel, allowing reducing the size down to only 20%. It is obvious that any other number of split switches could be used as well.

In the following the switching phases for an implementation in four phases are given. An implementation in three phases is also possible and will be outlined after the four-phase implementation.

It should be noted that an order of phases is not important. There is also no feedback to the digital controller so any waiting is necessary at all between different phases. Regular switching of all 4 phases is enough to reach a steady state after few of periods. The following description is valid for a steady state. The digital controller is sequentially running through the different phases.

In phase 1 switch S1 is closed connecting Vdd voltage to the top plate of the first floating capacitor CF1. Switches S11 and S12 are also closed connecting the bottom plate of the first flying capacitor CF1 to the top plate of the second flying capacitor CF2. Switches S9 and S10 are used to connect the bottom plate of the second flying capacitor CF2 to the positive output node OUTP. In this phase all other switches are open. This creates Vdd voltage on the top plate of CF1 and Vp voltage on the bottom plate of CF2. If Vp is equal to Vdd/4 the two flying capacitors CF1 and CF2 will have a voltage of the value ¾ VDD across them In phase 2 both bottom plates of CF1 and CF2 are connected to the negative output node OUTN via switches S7 and S8. The top plate of CF2 is grounded via switch S3. The top plate of CF1 is connected to OUTP via switch S5. Thus Vn will have the value of −Vdd/4.

In phase 3 the two capacitors CF1 and CF2 are connected, as in phase 1, in series between VDD and Vp on node OUTP charging the two flying capacitors CF1 and CF2 to ¾ Vdd voltage.

In phase 4 the bottom plate of CF2 is connected to ground via switches S10 and S4 and the top plate of CF2 is connected to OUTP via switch S6 and the bottom plate of CF1 is connected to OUTN via switch S7 and the top plate of CF1 is connected via switch S5 to OUTP causing voltage Vp to Vdd/4.

The phases regularly follow each other having a defined duration; in a preferred embodiment each phase has duration of 500 ns. In a preferred embodiment duration of 500 ns equals half of period of a preferred maximum clock frequency of 1 MHz used. The frequency is designed to be reduced down to 1/16 MHz to save power, when the load current of the charge pump is low, which is detected by detector described above, which further reduces power consumption by reducing switch size to 20%. Each halving of frequency reduces dynamic current losses to half and 20% size of switches also halves the dynamic current losses. Reducing of frequency can be done by various method of pulse skipping. The max frequency is limited by design and technology, where in the preferred embodiment the minimum frequency of 1 MHz/16=62.5 kHz was chosen to avoid aliasing of switching frequency to audio band and so creating unwanted noise increase. Other durations of the different phases than used in the preferred embodiment are possible as well.

It should be understood that different output voltage modes are based on slightly modified equations. There is with different output voltage modes no timing difference between phases. For example if +/−V/dd/3 is desired the following equations are valid and achieved by suitable switching:
Phase 1: VCF1+VCF2+Vp=Vdd
Phase 2: VCF1=Vp; VCF2=Vn
Phase 3: same as phase 1
Phase 4: VCF1=Vn; VCF2=Vp
A steady state will be reached after a few periods, namely: VCF1=Vp=Vdd/3, VCF2=Vn=−Vdd/3.

In case +/−V/dd/2 is desired the following equations are valid and achieved by suitable switching (alternatively +/−V/dd/2 can be supplied using one flying capacitor only):
Phase 1: Vcf1+Vcf2=Vdd: or (VCF1+Vp=Vdd, for mode with only 1 cap Cf1)
Phase 2: Vcf1=Vp, Vcf2=Vn or (Vcf1=Vp only one cap Cf1)
Phase 3: same as phase 1, VCF1+Vcf2=Vdd . . . .
Phase 4: Vcf2=Vp, Vcf1=Vn or (Vcf1=Vn only one cap Cf1)

In case +−VDD (push-pull operation CP) is desired the following equations are valid and achieved by suitable switching.
Phase1=Phase 3: Vcf132 Vdd, Vcf2=Vn, (by switch S0 Vp=Vdd)
Phase2=Phase4: Vcf232 Vdd, Vcf1=Vn (by switch S0 Vp=Vdd)

The structure of S3 and S13 allow to use 2.5V devices MOS (transistors). As in certain modes if only a single switch is used 5V can be presented on its terminals, so by series connection of two switches the higher 5V voltage can be avoided and smaller devices can be used, also it gives the advantage to use push-pull operation of charge pump wherein switch S0 ensures Vp=Vdd in +−VDD mode. Switch S0 is used only in +−VDD mode, when supply VDD is passed directly to positive output OUTP through this switch. Switch S2 is used in different voltage output modes as +−Vdd/3, +−Vdd/2, and +−Vdd.

The following table shows the status of the switches S0-13 in the operating modes: Standby, +/−VDD/4, +/−VDD/3, +/−VDD/2, +/−VDD, and +/−VDD/2 (using one flying capacitor only). The numbers in the fields signify the phases in which a switch is ON. Cases in which a switch is in all phases ON or OFF are signified by ON or correspondingly OFF. For example switch S1 is OFF in Standby mode, is ON in phases 1 and 3 of +/−VDD/4 mode, is ON in phases 1 and 3 of +/−VDD/3 mode, is ON in phases 1 and 3 in +/−VDD/2 mode, +/−VDD/4, is OFF in all phases of +/−VDD mode, and is ON in phases 1 and 3 of +/−VDD/2 mode, using one flying capacitor only.

| Switches | Standby | +/− Vdd/4 | +/− Vdd/3 | +/− Vdd/2 | +/− Vdd | +/− Vdd/2 1 capacitor. |
|---|---|---|---|---|---|---|
| S0 | OFF | OFF | OFF | OFF | ON | OFF |
| S1 | OFF | 13 | 13 | 13 | OFF | 13 |
| S2 | OFF | OFF | 4 | 4 | 24 | 4 |
| S3 | OFF | 2 | 2 | 2 | 13 | 2 |
| S4 | ON | 24 | 24 | 1234 | ON | 1234 |
| S5 | ON | 24 | 2 | 2 | 13 | 2 |
| S6 | ON | 4 | 4 | 4 | 24 | 134 |
| S7 | OFF | 24 | 4 | 4 | 24 | 4 |
| S8 | OFF | 2 | 2 | 2 | 13 | 2 |
| S9 | OFF | 13 | 13 | OFF | OFF | OFF |
| S10 | ON | 134 | 134 | 134 | 24 | 134 |
| S11 | ON | 13 | 123 | 123 | 13 | 123 |
| S12 | OFF | 13 | 13 | 13 | OFF | 13 |
| S13 | ON | 24 | 24 | 24 | ON | 24 |

FIG. 2 illustrates the switching sequence in four phases for the ±Vdd/4 mode according the arrangement of switches shown in FIG. 1.

It should be noted that a three-phase implementation to achieve the ±Vdd/4 mode is also possible. As outlined above a Vdd/4 charge pump having two flying capacitors operates implementing these equations in different phases
Phase1: A) VCF1+VCF2+Vp=Vdd
Phase2: B) VCf1=Vp+Vn; C) VCF2=Vn
Phase3: same as phase 1, VCF1+VCF2+Vp=Vdd
Phase4: B) VCF1=Vp+Vn, D) VCF2=Vp By solving four above equations A), B), C), D), there is only one possible solution, which gives us: VCF1=Vdd/2, VCF2=Vdd/4, Vp=Vdd/4, Vn=−Vdd/4.

Figure 3:
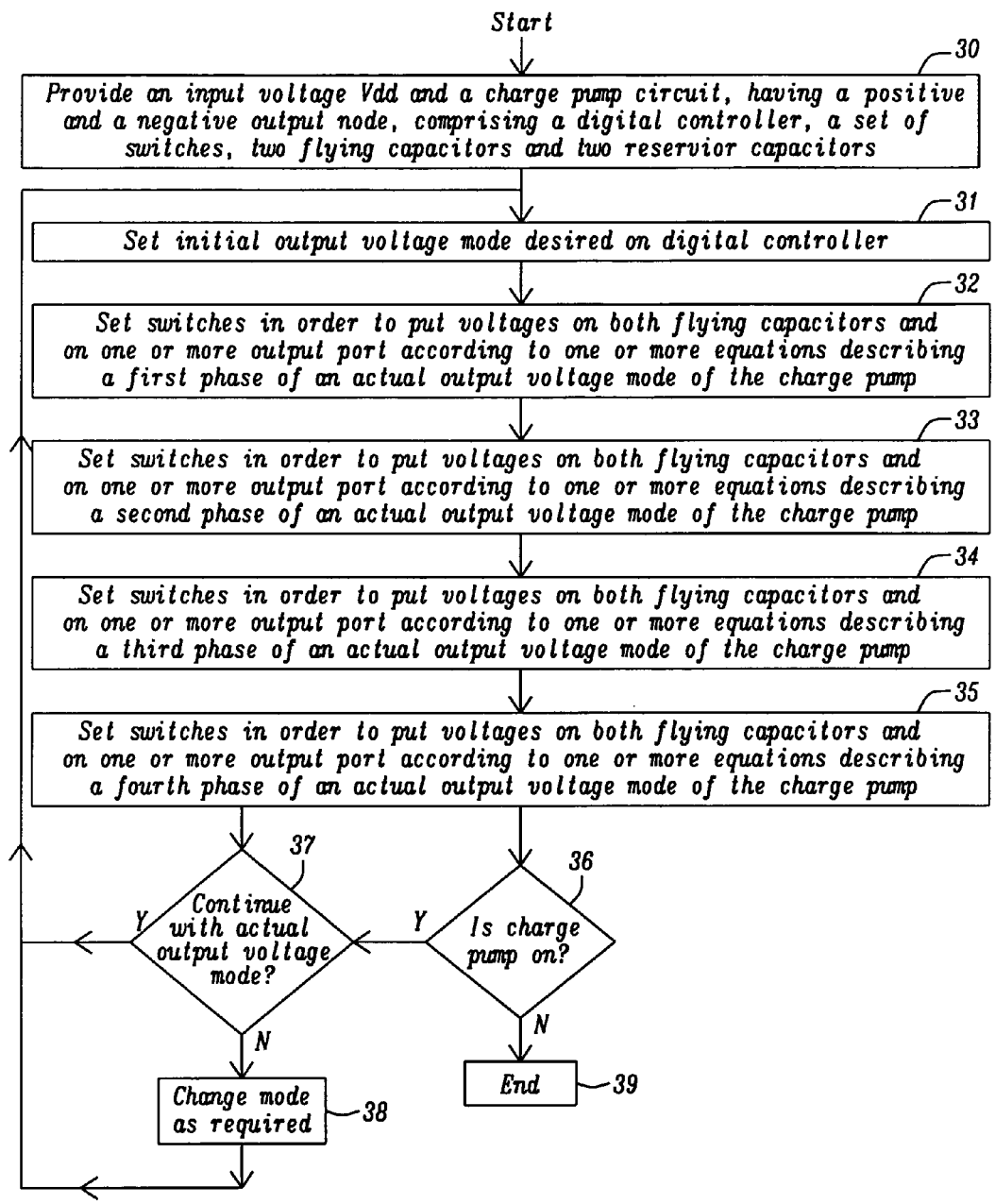
FIG. 3 illustrates a flowchart of a method invented of generating energy efficient supply voltages being symmetrical around ground voltage.

As shown above phase 3 is identical to phase 1 and can be skipped. In a preferred embodiment of the invention a four phases implementation has been selected because in a four phases implementation additional output modes as e.g. +/−Vdd/3 output mode can be selected FIG. 3 illustrates a flowchart of a method invented of generating energy efficient supply voltages being symmetrical around ground voltage. A first step 30 describes the provision of an input voltage Vdd and a charge pump circuit, having a positive and a negative output node, comprising a digital controller, a set of switches, two flying capacitors, and two reservoir capacitors. The next step 31 depicts the setting of output voltage mode desired on the digital controller. The digital controller controls the charge pump in a way that just the amount of power, required by a stage supplied by the charge pump, is provided by the charge pump. In a preferred embodiment of the invention where the charge pump is supplying a class-G audio amplifier the amount of power is according to gain setting, i.e. the audio volume. The following step 32 illustrates setting switches in order to put voltages on both flying capacitors and on one or more output port according to one or more equations describing a first phase of an actual output voltage mode of the charge pump. Step 33 describes setting switches in order to put voltages on both flying capacitors and on one or more output port according to one or more equations describing a second phase of an actual output voltage mode of the charge pump. Step 34 discloses setting switches in order to put voltages on both flying capacitors and on one or more output port according to one or more equations describing a third phase of an actual output voltage mode of the charge pump. Step 35 illustrates setting switches in order to put voltages on both flying capacitors and on one or more output port according to one or more equations describing a fourth phase of an actual output voltage mode of the charge pump. Step 36 is a check if the charge pump is still on, if it so, the process flow goes to step 37, else the process flow goes to step 39, which describes the end of the process. Step 37 is a check if the process will be continued with the actual output voltage mode, if it so, the process flow will go back to step 32, else the process flow goes to step 38. In step 38 the output voltage mode will be set by the controller as required and the process flow goes to step 32.

In summary, the charge pump invented operates to reach Steady State to satisfy each phase and such to solve a correspondent set of equations. In this way the charge pump provides certain ideal voltages, which are $+-Vdd/4$, $+-Vdd/3$, etc without consuming significant power. Power saving and efficiency is reached by a conversion that does not need linear resistance. The charge pump acts as transformer transforming input power Pin=Vdd×Idd (supply voltage×supply current) to output power Pout=Vout×Iout, wherein as Vout=Vdd/4 to satisfy power equilibrium (in lossless case) Pin=Pout then Iload=4×Idd. Of course there are losses due to resistance of switches, and also due to principles of charge pump operations.

In order to reduce power dissipation in case of Class G (H) amplifiers the lowest available supply voltage (efficiently generated by a DC-DC converter) should be used. Due to the availability of different supply voltages for an output stage by the present invention the power consumption is minimized. A class G amplifier operates more efficiently for low signal amplitude below Vdd/4 supply voltages.

While the invention has been particularly shown and described with reference to the preferred embodiments thereof, it will be understood by those skilled in the art that various changes in form and details may be made without departing from the spirit and scope of the invention.

What is claimed is:

1. A method for generating from a single supply voltage Vdd energy efficient supply voltages being symmetrical around ground voltage, comprising the following steps:
    (1) providing an input voltage Vdd and a charge pump circuit, having a positive and a negative output node, comprising a digital controller, a set of switches, two or more flying capacitors leading to output voltage ratios of $+/-Vdd/2^N$ with just N flying capacitors, and two reservoir capacitors;
    (2) setting output voltage modes desired on the digital controller;
    (3) setting switches in order to put voltages on the flying capacitors and on at least one output port according to one or more equations describing a first phase of an actual output voltage mode of the charge pump;
    (4) setting switches in order to put voltages on the flying capacitors and on at least one output port according to one or more equations describing a second phase of an actual output voltage mode of the charge pump;
    (5) setting switches in order to put voltages on the flying capacitors and on one or more output port according to one or more equations describing a third phase of an actual output voltage mode of the charge pump;
    (6) setting switches in order to put voltages on the flying capacitors and on one or more output port according to one or more equations describing a fourth phase of an actual output voltage mode of the charge pump;
    (7) go to step (8) if charge pump is on, else go to step (10);
    (8) go to step (9) if output voltage mode is to be changed, else go to step (3);
    (9) change output voltage mode and go to step (3); and
    (10) end.

2. The method of claim 1 wherein said switches comprise NMOS switches.

3. The method of claim 1 wherein the output voltage modes are set according to gain setting of a stage supplied by the charge pump.

4. The method of claim 3 wherein output voltages of a value of ±¼ Vdd, ±⅓ Vdd, ±½ Vdd, or ±Vdd voltage can be achieved.

5. The method of claim 1 wherein the equations describing four phases of a ±¼ Vdd output voltage mode using two flying capacitors comprise:
    Phase 1: A) the voltage across a first flying capacitor+the voltage across a second flying capacitor+the voltage of the positive output node=Vdd;
    Phase 2: B) the voltage across the first flying capacitor=the sum of the voltages on the positive and negative output nodes; and C) The voltage on the negative output node=the voltage desired (Vn);
    Phase 3: A) the voltage across the first flying capacitor+the voltage across the second flying capacitor+the voltage of the positive output node=Vdd; and
    Phase 4: B) the voltage across the first flying capacitor=the sum of the voltages on the positive and negative output nodes; D) The voltage on the positive output node=the voltage desired (Vp), wherein the solutions of these equations yield:
    the voltage across the first flying capacitor=Vdd/2, the voltage across the second flying capacitor=Vdd/4, the voltage of the positive output node=Vdd/4, the voltage of the negative output node=−Vdd/4.

6. The method of claim 1 wherein the equations describing four phases of a ±⅓ Vdd output voltage mode using two flying capacitors are:
    Phase 1: A) the voltage across a first flying capacitor+the voltage across a second flying capacitor+the voltage of the positive output node=Vdd;
    Phase 2: B) the voltage across the first flying capacitor=the voltage on the positive output node; C) the voltage across the second flying capacitor=the voltage on the negative output node;

Phase 3: A) the voltage across the first flying capacitor+the voltage across the second flying capacitor+the voltage of the positive output node=Vdd;

Phase 4: C) the voltage across the first flying capacitor=the voltage on the negative output node; D) the voltage across the second flying capacitor=the voltage of the positive output node, wherein the solution of these equations yields: the voltage across the first flying capacitor=the voltage of the positive output node=Vdd/3, the voltage across the second flying capacitor=the voltage on the negative output node=−Vdd/3.

7. The method of claim 1 wherein the equations describing four phases of a ±½ Vdd output voltage mode using two flying capacitors comprise:

Phase1: the voltage across a first flying capacitor+the voltage across a second flying capacitor=Vdd;

Phase 2: the voltage across the first flying capacitor=the voltage of the positive output node, the voltage across the second flying capacitor=the voltage on the negative output node;

Phase 3: the voltage across the first flying capacitor+the voltage across the second flying capacitor=Vdd;

Phase 4: the voltage across the second flying capacitor=the voltage of the positive output node, the voltage across the first flying capacitor=the voltage on the negative output node, wherein the solution of these equations yields: the voltage across the first flying capacitor=the voltage across the second flying capacitor=the voltage of the positive output node=Vdd/2; the voltage on the negative output node=−Vdd/2.

8. The method of claim 1 wherein the equations describing four phases of a ±Vdd output voltage mode using two flying capacitors comprise:

Phase1=Phase 3: the voltage across a first flying capacitor=Vdd, the voltage across a second flying capacitor=the voltage on the negative output node;

Phase2=Phase4: the voltage across the second flying capacitor=Vdd, the voltage across the first flying capacitor=the voltage on the negative output node, wherein the solution of these equations yields: the voltage across the first flying capacitor=the voltage across the second flying capacitor=the voltage of the positive output node=Vdd; the voltage on the negative output node=−Vdd.

9. The method of claim 1 wherein a detection circuit at the output nodes of the charge pump detects a drop of voltage due to load and based on this the frequency of charge pump is adjusted by the digital controller.

10. The method of claim 9 wherein a size of switches is reduced in order to reduce power consumption in case a set minimum frequency is reached.

11. The method of claim 10 wherein each switch of said set of switches is implemented by a number of switches in parallel in order to be capable to reduce the size of switches.

12. The method of claim 11 wherein each switch of the set of switches comprises five switches in parallel.

13. The method of claim 1 wherein output voltages of +/−Vdd/4 are achieved in three switching phases, wherein said third phase is skipped.

14. The method of claim 1 wherein the four phases of an output voltage mode of the charge pump have a fixed duration.

15. The method of claim 14 wherein said fixed duration is 500 ns.

16. A charge pump generating from a single supply voltage Vdd energy efficient supply voltages being symmetrical around ground voltage, comprises:

a digital controller, controlling the operation of the charge pump in a way that the charge pump is providing just the amount of power required by a stage supplied by the charge pump;

a first input port connected to Vdd voltage;

a second input port connected to ground;

a positive output node;

a negative output node;

two reservoir capacitors, wherein a first reservoir capacitor is connected between the positive output node of the charge pump and ground and a second reservoir capacitor is connected between the negative output node of the charge pump and ground;

two or more flying capacitors leading to output voltage ratios of +/−Vdd/$2^N$ with just N flying capacitors; and a set of switches activating charging of the flying capacitors and connecting first or second plates of the flying capacitors to the positive and negative output nodes wherein the set of switches and the related charging of the flying capacitors are controlled by the digital controller in way that the positive and negative output nodes supply symmetrical output voltages required.

17. The charge pump of claim 16 wherein using two flying capacitors the charge pump output nodes supply ±¼Vdd, ±⅓Vdd, ±½ Vdd, or ±Vdd voltage.

18. The charge pump of claim 16 wherein said set of switches comprises 14 switches.

19. The charge pump of claim 18 wherein said set of switches comprises a first switch, wherein a first terminal is connected to the first input port and a second terminal is connected to the positive output node;

a second switch, wherein a first terminal is connected to the first input port and a second terminal is connected to the first plate of a first flying capacitor;

a third switch, wherein a first terminal is connected to the second input port and a second terminal is connected to the first plate of the first flying capacitor;

a fourth switch, wherein a first terminal is connected to the second input port and a second terminal is connected to the first plate of a second flying capacitor;

a fifth switch, wherein a first terminal is connected to the second input port and a second terminal is connected to a second terminal of an eleventh switch;

a sixth switch, wherein a first terminal is connected to the first plate of the first flying capacitor and a second terminal is connected to the positive output node;

a seventh switch, wherein a first terminal is connected to a first plate of the second flying capacitor and a second terminal is connected to the positive output node;

an eighth switch, wherein a first terminal is connected to a second plate of the first flying capacitor and a second terminal is connected to the negative output node;

a ninth switch, wherein a first terminal is connected to a second plate of the second flying capacitor and a second terminal is connected to the negative output node;

a tenth switch, wherein a first terminal is connected to a second terminal of the fifth switch and a second terminal is connected to the positive output node;

said eleventh switch, wherein a first terminal is connected to the second plate of the second flying capacitor;

a twelfth switch, wherein a first terminal is connected to the second plate of the first flying capacitor and a second terminal is connected to a first terminal of a thirteenth switch;

said thirteenth switch, wherein a first terminal is connected to a second terminal of a fourteenth switch and a second terminal is connected to the first plate of the second flying capacitor; and said fourteenth switch, wherein a first terminal is connected to ground.

20. The charge pump of claim 16 wherein each high side switch of said set of switches has an integrated charge pump providing the necessary gate-source voltage.

21. The charge pump of claim 19 wherein said second, sixth, eight, ninth, eleventh, twelfth, and thirteenth switch have an integrated charge pump.

22. The charge pump of claim 19 wherein said set of switches, except said first switch, which is a PMOS switch, comprises NMOS switches.

23. The charge pump of claim 16 wherein all components except the capacitors are integrated in an integrated circuit.

24. The charge pump of claim 16 wherein said controller controls the frequency of switch controls and the width of the switch devices in a way that the voltages generated on the output nodes are just enough for an audio signal to be correctly generated at the output of an audio amplifier supplied by the charge pump.

25. The charge pump of claim 16 wherein a detection circuit at the output nodes of the charge pump detects a drop of voltage due to load and based on this the frequency of charge pump is adjusted by the digital controller.

26. The charge pump of claim 25 wherein size of switches is reduced in order to reduce power consumption in case a set minimum frequency is reached.

27. The charge pump of claim 16 wherein each switch of said set of switches is implemented by a number of switches in parallel in order to be capable to reduce the size of switches.

28. The charge pump of claim 27 wherein each switch of the set of switches comprises five switches in parallel.

* * * * *